3,421,917
ALUMINOSILICATE REFRACTORY BRICK
Stanley R. Pavlica, Irwin, and Berhl E. Wisbon, Bethel Park, Pa., assignors to Dresser Industries, Inc., Dallas, Tex., a corporation of Delaware
No Drawing. Filed Apr. 28, 1966, Ser. No. 545,882
U.S. Cl. 106—67                                    5 Claims
Int. Cl. C04b 33/32; C04b 33/22

ABSTRACT OF THE DISCLOSURE

A ceramically bonded fireclay brick analyzing less than 0.2% alkali oxides prepared from a batch comprising aluminosilicate grogs and bond clays which analyze less than 0.75% alkali oxides.

---

Natural aluminosilicates which include, among others, clays, diaspore, kyanites, and bauxites are the major ingredients for a large number of refractory brick currently manufactured. This invention pertains to brick made from these raw materials which are known in the art as fireclay brick if they analyze less than 50% $Al_2O_3$. Very generally, the properties of aluminosilicate brick vary with the percentage alumina they contain. This may be explained to a large extent by the quantity and type of mineral and glass phases formed by the aluminosilicate materials when the brick are burned.

As the alumina content of fireclay and high alumina brick is increased, resistance to load at elevated temperatures tends to increase. Also, resistance to spalling on rapid temperature change tends to increase. These property changes are usually attributed to a reduction in quantity of low refractory and brittle silicate glasses present in the groundmass of the brick. On the other hand, increasing the alumina usually results in an increase in porosity making the brick physically more vulnerable to the chemical attack of metallurgical slags. In addition, brick higher in alumina tend to have less resistance to alkali vapors.

There are several applications of refractory brick which require good resistance to spalling, metallurgical slags, alkalies and loads at elevated temperatures all at the same time. For example, the lining of a blast furnace used in reduction of iron ore is such an application.

It is an object of this invention to provide aluminosilicate refractories having an improved combination of resistance to load at elevated temperatures, thermal spalling, metallurgical slag and alkali attack. It is another object of this invention to provide a ceramically bonded aluminosilicate refractory especially suited for blast furnace linings.

Briefly, according to one aspect of this invention, a ceramically bonded fireclay brick is made from a batch comprised of a size graded aluminosilicate grog and bond clays. The total alkali content of the bond clays used in the practice of this invention is less than 0.75%, preferably less than 0.5% and typically less than 0.2% on a calcined oxide basis. The total alkali content of the burned brick is less than 0.2%. According to a preferred aspect of this invention, the aluminosilicate grog is calcined above about 2800° F. and the brick are burned above about 2800° F. Typically the aluminosilicate grog comprises 70 to 90% of the batch and the bond clays comprise 10 to 30% of the batch.

Brick according to this invention subside less than 1% in the 2600° F.-100-hour-load test (defined hereafter) and lose less than 4% in the panel spalling test.

A better understanding and further features and advantages of the practice of this invention will become readily apparent to those skilled in the art by a study of the following detailed description and examples. It should, of course, be understood that these examples are given by way of explanation and not by way of limitation. All size gradings are according to the Tyler series, unless otherwise specified. All chemical analysis, unless otherwise specified, are on the basis of an oxide analysis in conformity with the conventional practices of reporting the chemical content of refractory materials. All analyses should be considered typical. All parts and percentages are by weight.

Examples A through G were prepared by mixing various bond clays and size graded fireclay grog. The bond clays differed primarily in their total alkali content

$(K_2O+Na_2O+Li_2O)$ which ranged from 0.12 to 1.67% on a calcined basis. The mixes were all fabricated into brick in the same manner. The grog was first prepared by calcining at about 2800° F. Then, it was sized and graded so that when mixed with the bond clays the sizing of the total batch was from 10 to 20% +10 mesh (Tyler), 20 to 30% −10 mesh +28 mesh, 10 to 20% −28 mesh +65 mesh, from 40 to 50% passing 65 mesh and from 35 to 45% passing 150 mesh. The bond clays were substantially all −150 mesh.

The size graded batches were tempered in a muller-type mixer with sufficient moisture to render the batch pressable (usually from 4.5 to 5.5%). The batches were pressed into brick at about 5000 p.s.i. The brick were dried at about 250° F. for at least 5 hours and thereafter burned or fired. The firing schedule was 100° per hour to 2800° F. with a 10-hour hold at the maximum temperature.

After cooling, the brick were submitted to a series of tests to determine their resistance to subsidence under load at 2600° F., alkali attack and thermal spalling. Standard physical and chemical properties were also determined. The results of these tests along with batch compositions are given in Table I.

TABLE I

| Example | A | B | C | D | E | F | G |
|---|---|---|---|---|---|---|---|
| Mix, percent: | | | | | | | |
| Coarse and Fine Grog (45% $Al_2O_3$) | 85 | 85 | 85 | 80 | 85 | 75 | 85 |
| Bond Clay g | 15 | 15 | 15 | 20 | 15 | 25 | 15 |
| Alkalies in Bond Clay, percent | 0.12 | 0.18 | 0.46 | 0.46 | 0.58 | 1.67 | 1.67 |
| Alkalies in Burned Brick, percent | 0.09 | 0.08 | 0.10 | 0.12 | 0.11 | 0.48 | 0.25 |
| Bulk Density, p.c.f. (Av. 20) [1] | 158 | 157 | 154 | 153 | 153 | 156 | 156 |
| Apparent Porosity (Av. 4),[2] percent | 9.1 | 9.4 | 9.8 | 10.3 | 10.7 | 9.8 | 9.6 |
| Percentage Loss in Panel Spalling Test with 3,000° F. Preheat: [3] | | | | | | | |
| Average, 6 samples | 0.4 | 0.6 | ([5]) | 1.6 | 2.8 | 4.5 | ([5]) |
| Range, 6 samples | 0-1.9 | 0-1.5 | ([5]) | 0.2-3.7 | 1.0-7.0 | 0.2-13.4 | ([5]) |
| Load Test, 25 p.s.i., Subsidence After 100 Hours at 2,600° F. (Av. 2),[4] percent | 0.4 | 0.3 | 0.8 | 0.6 | 0.6 | 3.1 | 3.5 |
| Special alkali Slag Test | ([6]) | ([6]) | ([6]) | ([6]) | ([6]) | ([7]) | ([6]) |

[1] Standard Methods of Test for Size and Bulk Density of Refractory Brick, American Society for Testing Materials (ASTM) Designation C134-41. Manual of ASTM Standards on Refractory Materials, 9th Edition, page 154 (1963).
[2] Standard Methods of Test for Apparent Porosity, ASTM Designation C20-46, ibid. page 159.
[3] Standard Method of Panel Spalling Test for Super Duty Fireclay Brick, ASTM Designation C122-52, ibid, page 62.
[4] Standard Method of Testing Refractory Brick Under Load at High Temperatures, ASTM Designation C16-62, ibid. page 127.
[5] Not run.
[6] No cracking.
[7] Slight cracking.

Table I establishes that the alkali content of bond clays used in the practice of this invention is very important because it affects the resistance to load, spalling resistance, and alkali resistance. Mixes A through E, according to this invention, subsided less than 1% in the 2600° F.-100-hour-25 p.s.i.-load test, hereafter referred to as the long-time-load test. Most prior known aluminosilicate brick subside between 2 and 8% in this test and we know of none that subsides less than 1%. The aluminosilicate brick which, until this time, was considered superior to others in the long-time-load test are referred to as mullite brick. They contain alumina ($Al_2O_3$) and silica ($SiO_2$) in a ratio of about 3:2 and are usually prepared from an expensive synthetic mullite grain. Mullite brick typically subside between 1 and 2% in the long-time-load test. Brick made according to this invention, i.e., the alkali content in the bond clays being less than about 0.75% are therefore superior to the best prior art brick. Notice that when the alkali content is less than about 0.25% the subsidence in the load test is less than 0.5%.

Turning now to the results of the spalling test, Table I establishes that tendency to spall rapidly increases as the alkalies in the bond clay exceed 0.5% and especially as the alkalies exceed about 0.75%. Typically, fireclay loses between 2 and 8% in this test. By compromising density, fireclay brick classified as spall resistant are manufactured which lose less than about 4%. Notice that brick made according to this invention do not compromise density but still lose less than 4%. According to the preferred aspects of this invention, embodied in Examples A and B, the loss is less than 1% with an actual increase in density. Results of the special alkali test are those generally expected of fireclay brick. Notice Example F, not within this invention, showed slight distress.

Mineralogical examination of Examples A and B showed both were composed of major mullite and minor cristobalite with very little amorphous material or glass being present. X-ray studies indicated substantially no glassy material in Examples A and B. The other example made according to this invention would also be substantially free of glassy material.

Examples H, H–I and I (Table II) were prepared from high alumina grog and bond clays. The finer fraction of the high alumina grog (−65 mesh) was 75% $Al_2O_3$. In the coarse fraction, 60% $Al_2O_3$. These examples were batched, pressed and dried in the same manner as Examples A to G. H and I were burned at 2700° F. however. In addition, several brick of H–I were burned at 2800° F. Results of testing and batch compositions for these brick are given in the following table.

TABLE II

| Example | H | I | H–I |
|---|---|---|---|
| Mix (burned) | 2,700° F. | | 2,800° F. |
| Coarse Grog (60% $Al_2O_3$), percent | 60 | 60 | 60 |
| Fine Grog (75% $Al_2O_3$), percent | 25 | 25 | 25 |
| Bond Clay, percent | 15 | 15 | 15 |
| Alkalies in Bond Clay, percent | 0.72 | 0.12 | 0.72 |
| Alkalies in Burned Brick, percent | 0.15 | 0.10 | 0.15 |
| Bulk Density, p.c.f. (av. 26) | 157 | 155 | |
| Apparent Porosity (av. 4) | 15.6 | 17.0 | |
| Percentage Loss in Panel Spalling Test with 3,000° F. Reheat | ([1]) | ([1]) | |
| Load Test, 25 p.s.i. Subsidence after 100 hours at 2,600° F. (av. 2), percent | | | 2.3 |
| Load Test, 25 p.s.i. Subsidence after 90 min. at 2,900° F. (av. 2), percent | 6.9 | 6.2 | |
| Special Alkali Slag Test | | | ([2]) |

[1] No loss.
[2] Slight cracking.

Examples H–I burned at 2800° F. should first be compared to Examples A to E. All of these examples analyze less than 0.75% alkalies and were prepared with the same firing treatment. However, the matrix or groundmass of Examples H–I is much less silicious than the others. Examples H–I subsided 2.3% in the long time load test, almost 4 times as much as Example E which contained the most similar bond clay. Apparently, the low alkali clays only provide a substantial decrease in subsidence in a more silicious groundmass. We consider this surprising, because it was generally thought that high alumina brick have better resistance to loads at elevated temperatures than fireclay brick. (It will be seen that this remains true at higher temperatures.)

Examples H–I burned at 2800° F. were slightly cracked in the alkali slag test which is to be expected for high alumina brick.

A few words here are appropriate as to what is meant by silicious groundmass. Alumina and silica present in aluminosilicate refractories react on firing to form, for the most part, the mineral mullite. Three moles of alumina react with two moles of silica. If the ratio of alumina to silica exceeds 3:2, the burned brick will also contain corundum. If the ratio is less than 3:2, the burned brick will be substantially mullite and one of the crystalline or glassy forms of silica. Depending on the impurities present and the burning treatment, the silica will, to some extent, be in the form of a glass. The lower the alumina to silica ratio, the more $SiO_2$ that will be present in a crystalline or glassy form.

In most burned brick, the nature of the groundmass depends primarily on the −65 mesh constituent of the brickmaking batch. We have found that a groundmass is sufficiently silicious for the purpose of this invention if the −65 mesh grog is a fireclay or high alumina grog analyzing between 40 and 60% $Al_2O_3$.

Examples H and I burned at 2700° F. were tested for subsidence in the 2900° F.-90-minute-load test. They subsided 6.9 and 6.2%, respectively. Very little advantage was obtained by lowering the alkali content of the bond clay in this less silicious groundmass. Incidentally, fireclay brick are not usually submitted to the 2900° F.-90-minute-load test because they would normally collapse. However, when Mix B was submitted to this test, it subsided about 9%. This demonstrates that brick do not resist loads similarly at all temperatures. Clearly, at higher temperatures the high alumina brick are superior to fireclay brick. But even at these temperatures the silicious lower alkali groundmass contemplated by this invention is desirable.

Except for the special alkali cup slag test and the long-time-load test, all the tests referred to in this specification are standard tests and are designated by footnotes to Table I. The special alkali slag tests were run as follows: A hole 1 inch in diameter and 3 inches deep was drilled in the end of a brick sample (9 x 4½ x 2½ inches) to be tested. 34 grams of a 4 to 1 mixture of $K_2CO_3$ and $NaCO_3$ were placed within the pocket. The brick were heated in an oxidizing atmosphere to 2200° F. within three hours and held at that temperature for 5 hours. After cooling the brick samples were cut longitudinally through the slag pocket for examination. The brick were examined for the degree of cracking and disruption that took place.

The typical chemical analysis of the aluminosilicate grogs used in the examples above are as follows:

TYPICAL ANALYSIS OF GROGS

|  | Fireclay Grog | High Alumina Grog | High Alumina Grog |
|---|---|---|---|
| Percent: |  |  |  |
| $SiO_2$ | 52.0 | 37.2 | 21.3 |
| $Al_2O_3$ | 44.9 | 60.1 | 75.0 |
| $TiO_2$ | 1.6 | 2.0 | 2.6 |
| $Fe_2O_3$ | 1.3 | 0.9 | 1.1 |
| CaO | 0.1 | 0.3 | 0.1 |
| MgO | 0.1 | 0.3 | Trace |
| $Na_2O + K_2O + Li_2O$ | 0.10–0.20 | 0.05–0.15 | 0.1 |
| Used in Examples | A–G | H–I | H–I |

The following is a chemical analysis of the bond clays on a calcined basis used in the examples in this specification.

Brick made according to the teachings of this invention have an unusual combination of properties especially suited for blast furnace linings. Blast furnace linings are usually water cooled and in service for as many as 8 years. Therefore, the resistance to load at lower temperatures (around 2600° F.) over long periods of time is more important than high temperature load strength, say at 2900° F. Alkali attack and resistance to the chemical attack of metallurgical slags are also critical in blast furnace service as is resistance to thermal spalling. Brick made according to this invention have resistance to loads at 2600° F. superior to any other aluminosilicate brick known to us. It has the low porosity and low alkali resistance of fireclay brick and the spalling resistance of high alumina brick. The reason for this unusual combination of properties is not fully understood. We believe, however, that it may be related to the larger quantity of crystalline silica present in the groundmass of these brick.

Having thus described the invention in detail and with sufficient particularity as to enable those skilled in the art to practice it, what is desired to have protected by Letters Patent is set forth in the following claims.

We claim:
1. A ceramically bonded fireclay brick analyzing less than 50% $Al_2O_3$ and less than 0.2% alkali oxides made from a batch consisting essentially of 70 to 90%, by weight fireclay grogs and 10 to 30% bond clays analyzing less than 0.75% alkali oxides.
2. Brick according to claim 1 in which the bond clays analyze up to about 0.5% alkalies.
3. Brick according to claim 1 in which the bond clays analyze up to about 0.25% alkalies.
4. Brick according to claim 1 in which the grog in the fine fraction analyzes typically 45% alumina.
5. A method of making ceramically bonded fireclay brick comprising the steps of, (1) calcining a fireclay grog above 2800° F., (2) preparing a batch comprising 70 to 90% of said grog and 10 to 30% bond clay analyzing less than 0.75% alkali oxides, the alkali content of the batch being maintained sufficiently low such that the alkali content of the brick is less than 0.2%, by weight, (3) forming the batch into shapes, and (4) burning shapes in excess of about 2800° F.

References Cited

UNITED STATES PATENTS

| 3,103,443 | 9/1963 | Bissell et al. | 106—67 |
| 3,241,989 | 3/1966 | Wishon et al. | 106—67 |
| 3,356,514 | 12/1967 | Wishon et al. | 106—65 |

JAMES E. POER, *Primary Examiner.*

CHEMICAL ANALYSIS OF BOND CLAYS ON CALCINED BASIS

| Percent: |  |  |  |  |  |  |  |  |  |  |  |
|---|---|---|---|---|---|---|---|---|---|---|---|
| $SiO_2$ | 62.7 |  | 61.4 |  | 52.9 |  | 52.8 |  | 54.8 |  | 61.4 |
| $Al_2O_3$ | 30.9 |  | 34.0 |  | 44.8 |  | 44.5 |  | 39.2 |  | 33.5 |
| $TiO_2$ | 1.6 |  | 1.8 |  | 1.7 |  | 1.7 |  | 1.9 |  | 2.1 |
| $Fe_2O_3$ | 2.7 |  | 1.6 |  | 0.5 |  | 0.7 |  | 1.5 |  | 1.1 |
| CaO | 0.64 |  | 0.16 |  | 0.27 |  | 0.3 |  | 0.43 |  | 0.33 |
| MgO | 0.71 |  | 0.35 |  | 0.19 |  | 0.18 |  | 0.48 |  | 0.33 |
| $Na_2O$ | 0.08 |  | 0.07 |  | 0.05 |  | 0.11 |  | 0.09 |  | 0.08 |  |
| $K_2O$ | 0.62 | 0.72 | 0.48 | 0.58 | 0.05 | 0.12 | 0.05 | 0.18 | 1.48 | 1.67 | 0.36 | 0.46 |
| $Li_2O$ | 0.02 |  | 0.03 |  | 0.02 |  | 0.02 |  | 0.10 |  | 0.02 |  |
| Used in Examples | H |  | E |  | A, I |  | B |  | F, G |  | C, D |  |